United States Patent
Tamura et al.

(10) Patent No.: US 8,187,745 B2
(45) Date of Patent: May 29, 2012

(54) CATHODE FOR FUEL CELL

(75) Inventors: Jun Tamura, Yokohama (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 561 days.

(21) Appl. No.: 12/372,135

(22) Filed: Feb. 17, 2009

(65) Prior Publication Data

US 2009/0325021 A1 Dec. 31, 2009

(30) Foreign Application Priority Data

Jun. 30, 2008 (JP) ................. 2008-171484

(51) Int. Cl.
*H01M 4/02* (2006.01)
*H01M 4/13* (2010.01)
*H01M 4/36* (2006.01)
*H01M 4/62* (2006.01)
*H01M 4/92* (2006.01)

(52) U.S. Cl. ........ 429/209; 429/523; 429/524; 429/532; 429/533

(58) Field of Classification Search .................. 429/523, 429/524, 532, 533, 209
See application file for complete search history.

(56) References Cited

U.S. PATENT DOCUMENTS

| | | |
|---|---|---|
| 2006/0019148 A1 | 1/2006 | Tamura et al. |
| 2007/0082257 A1 | 4/2007 | Tamura et al. |
| 2007/0134533 A1 | 6/2007 | Tamura et al. |
| 2007/0166600 A1* | 7/2007 | Kang .............................. 429/42 |
| 2007/0207360 A1 | 9/2007 | Tamura et al. |
| 2008/0026282 A1 | 1/2008 | Tamura et al. |
| 2008/0254974 A1 | 10/2008 | Nakano et al. |
| 2010/0003566 A1* | 1/2010 | Tamura et al. ................. 429/30 |

FOREIGN PATENT DOCUMENTS

| | | |
|---|---|---|
| JP | 2004-158261 | 6/2004 |
| JP | 2006-32287 | 2/2006 |

OTHER PUBLICATIONS

U.S. Appl. No. 12/302,949, filed Dec. 1, 2008, Jun Tamura et al.
U.S. Appl. No. 12/201,332, filed Aug. 29, 2008, Jun Tamura et al.
U.S. Appl. No. 12/207,851, filed Sep. 10, 2008, Yoshihiko Nakano et al.

* cited by examiner

*Primary Examiner* — Patricia L Hailey
(74) *Attorney, Agent, or Firm* — Oblon, Spivak, McClelland, Maier & Neustadt, L.L.P.

(57) ABSTRACT

A cathode for a fuel cell is provided, which includes an electrode catalyst layer. This electrode catalyst layer is constituted by a carried catalyst including a conductive carrier and catalytic fine particles carried on the conductive carrier, by a proton-conductive inorganic oxide containing an oxide carrier and oxide particles carried on a surface of the oxide carrier, and by a proton-conductive organic polymer binder. The carried catalyst is incorporated therein at a weight of $W_C$. Silicon oxide is carried on the surface of the proton-conductive inorganic oxide at a weight ratio of 0.1-0.5 times as much as the weight of the proton-conductive inorganic oxide. The proton-conductive inorganic oxide is incorporated at a weight of $W_{SA+SiO2}$. The weight ratio ($W_{SA+SiO2}/W_C$) is confined to 0.01-0.25. The proton-conductive organic polymer binder is incorporated at a weight of $W_P$, the weigh ratio ($W_P/W_{SA+SiO2}$) is confined to 0.5-43.

20 Claims, 2 Drawing Sheets

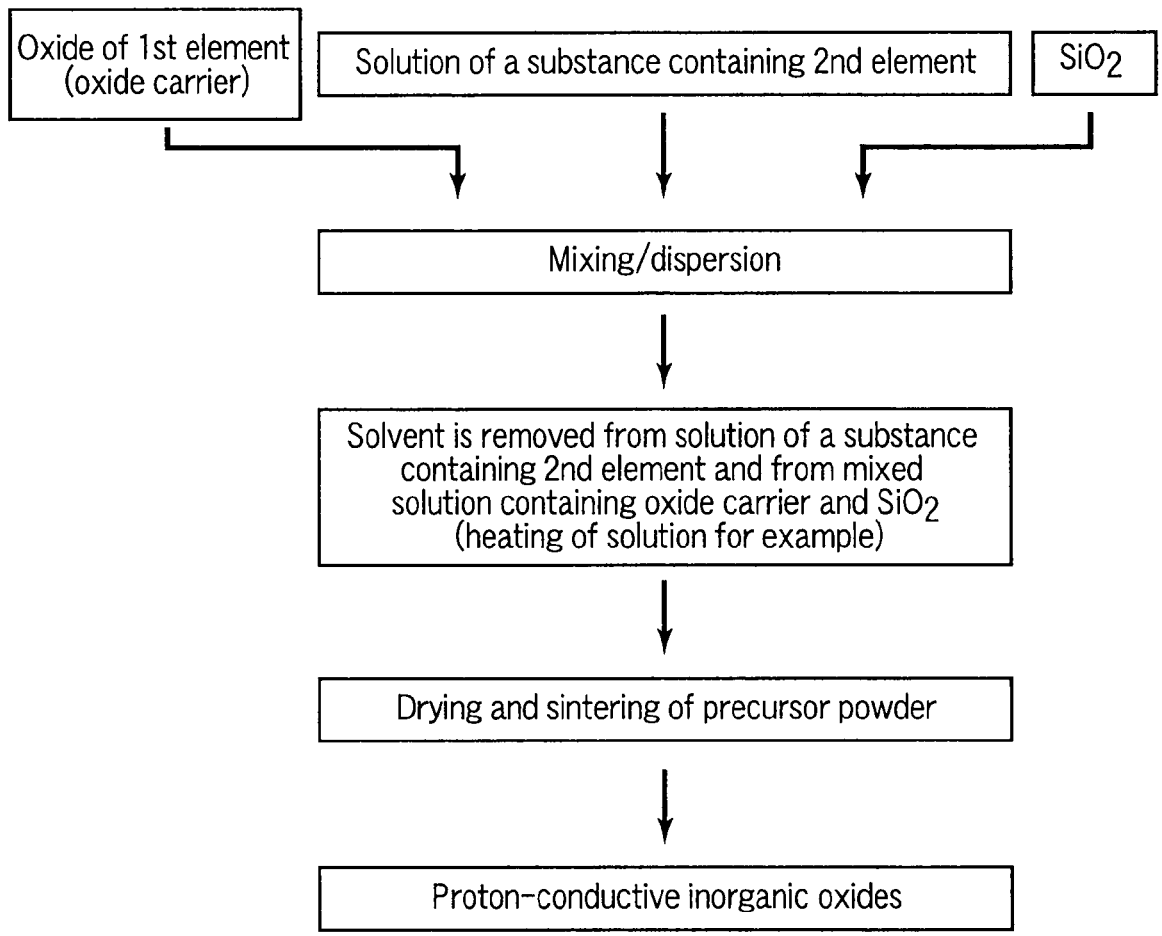
F I G. 1

CATHODE FOR FUEL CELL

CROSS-REFERENCE TO RELATED APPLICATIONS

This application is based upon and claims the benefit of priority from prior Japanese Patent Application No. 2008-171484, filed Jun. 30, 2008, the entire contents of which are incorporated herein by reference.

BACKGROUND OF THE INVENTION

1. Field of the Invention

The present invention relates to a cathode for a fuel cell, to a membrane electrode assembly, to a fuel cell and to a method of manufacturing proton-conductive inorganic oxides.

2. Description of the Related Art

With respect to the electrode for a fuel cell wherein a proton-conductive inorganic oxide and a proton-conductive organic polymer binder are employed, there has been known one comprising a proton-conductive inorganic oxide and a sulfuric acid-carrying metal oxide exhibiting solid exhibiting superacidity as described in JP-A 2004-158261(KOKAI) for example. The electrode of this kind is known as being unstable when it is used as a proton conductor for a fuel cell which produces water in the process of generating electricity, for a fuel cell which uses liquid fuel.

Meanwhile, the present inventors have proposed, as described in JP-A 2006-32287 (KOKAI), an electrode for a fuel cell, which comprises an oxide carrier using Ti, particles of oxide of W, and a binder for binding these materials. In an electrode catalyst layer formed of a composite constituted by an oxide (proton-conductive inorganic oxides) such as Ti, W, etc., a Pt catalyst and a binder, the continuity among the proton-conductive inorganic oxide as well as the continuity among the Pt catalyst carrier is obstructed due to the existence of the binder. Further, the binder that has adhered onto the surface of the proton-conductive inorganic oxide or the surface of the Pt catalyst obstructs the supply of water to the proton-conductive inorganic oxide. In such a case, due to the lack of water which is required for the production of protons, the supply of air to the Pt catalyst would become insufficient, thereby bringing about the shortage of three-phase interface needed for producing the electrode reaction.

In order to enhance the proton conductivity of the electrode catalyst layer and the electrode reaction, many efforts are now made on the development of the proton conductor. However, the performance of the proton conductor is still insufficient, leaving room for improvements.

Additionally, the conventional proton-conductive inorganic oxides have a great tendency that the nano-size particles of the proton-conductive inorganic oxides are caused to fuse to each other during the synthesis thereof, resulting in the growth of particles and hence in the decrease of specific surface area of the proton-conductive inorganic oxides, thereby reducing the useful proton-conducting site. Because of this, the proton conductivity decreases, so that it has been impossible to sufficiently increase the output of the fuel cell as a whole.

BRIEF SUMMARY OF THE INVENTION

A cathode for a fuel cell according to one aspect of the present invention comprises an electrode catalyst layer, this electrode catalyst layer comprising:

a carried catalyst containing a conductive carrier and catalytic fine particles carried on the conductive carrier, the carried catalyst being incorporated therein at a weight of $W_C$;

a proton-conductive inorganic oxide containing an oxide carrier and oxide particles carried on a surface of the oxide carrier;

silicon oxide carried on the surface at a weight ratio of 0.1 to 0.5 times as much as the weight of the proton-conductive inorganic oxide, a weight ratio ($W_{SA+SiO2}/W_C$) between the weight $W_C$ of carried catalyst and a total weight ($W_{SA+SiO2}$) of the proton-conductive inorganic oxide and the silicon oxide being confined to 0.01-0.25; and a proton-conductive organic polymer binder which is incorporated therein at a weight of $W_P$, the weigh ratio ($W_P/W_{SA+SiO2}$) thereof relative to the total weight of the proton-conductive inorganic oxide and the silicon oxide being confined to 0.5-43.

A membrane electrode assembly according to one aspect of the present invention comprises:

a fuel electrode;

an oxidizer electrode; and an proton conductive membrane having the aforementioned cathode for a fuel cell and disposed between the fuel electrode and the oxidizer electrode.

A fuel cell according to one aspect of the present invention comprises aforementioned membrane electrode assembly.

BRIEF DESCRIPTION OF THE SEVERAL VIEWS OF THE DRAWING

FIG. 1 is a flowchart illustrating the method of manufacturing a proton-conductive inorganic oxides according to one embodiment.

DETAILED DESCRIPTION OF THE INVENTION

Figure 2:
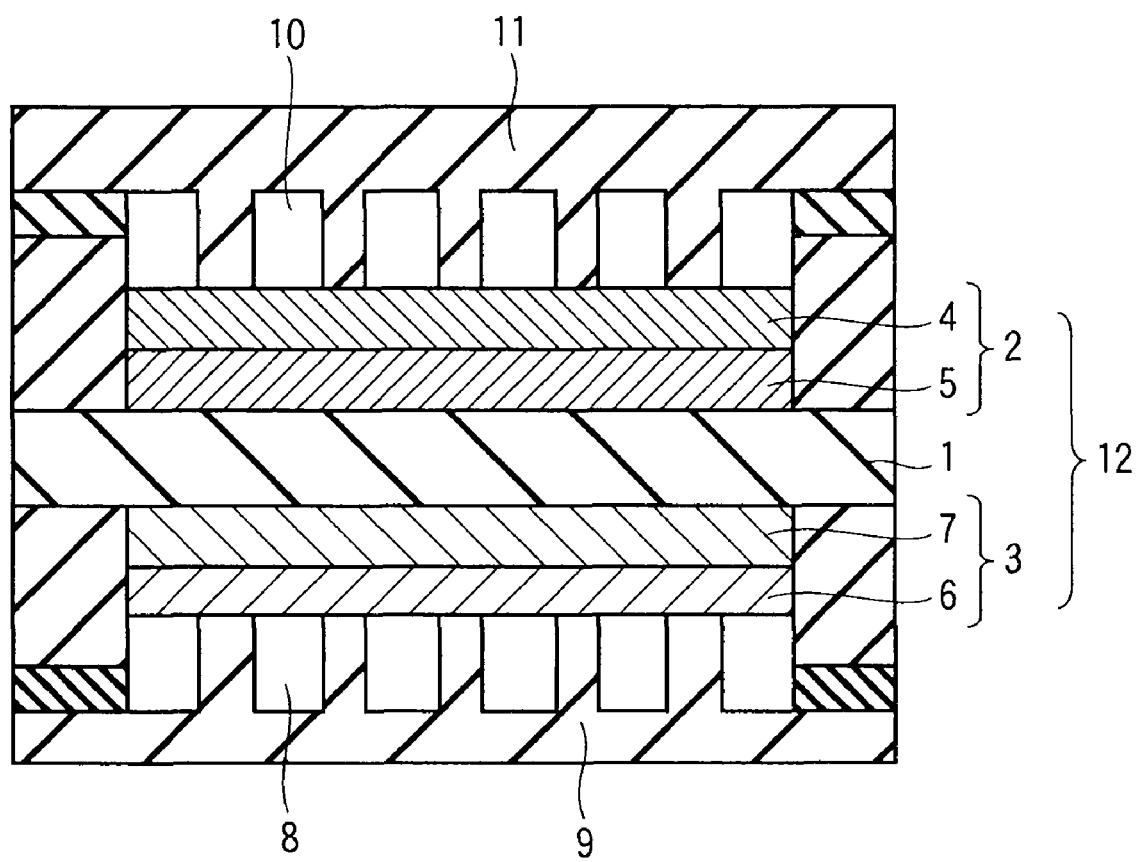
FIG. 2 is a side view schematically illustrating a fuel cell according to another embodiment.

Next, embodiments will be explained.

A cathode for a fuel cell according to one embodiment is featured in that it comprises an electrode catalyst layer which is constituted by a carried catalyst, a proton-conductive inorganic oxide and a proton-conductive organic polymer binder.

The carried catalyst includes a conductive carrier and catalytic fine particles carried on the conductive carrier. As the catalytic fine particles, it is possible to any kind of cathode catalyst for a fuel cell. Since Pt is very effective for the reduction reaction of oxygen, Pt is generally employed as a major catalytic element. Under some circumstances, a Pt alloy catalyst wherein Co or Fe is incorporated therein is enabled to exhibit a high catalytic activity, thereby making it possible to enhance the output.

As the conductive carrier, it is possible to employ carbon black for example. However, the conductive carrier is not limited to carbon black but may be formed of any other materials as long as they have sufficient conductivity and stability as the conductive carrier. Recently, there have been developed various kinds of nanocarbon materials such as fiber-like, tube-like and coil-like nanocarbon materials. Furthermore, it is also possible to employ ceramic materials having electric conductivity.

The catalytic fine particles can be attached to the conductive carrier by, for example, a dipping method, a precipitation method, a colloid method. When the catalytic fine particles are formed of a metal that can be oxidized through the reaction thereof with water, the metal can be directly attached to the conductive carrier by a sputtering method, vapor deposition method, etc. By these methods, it is possible to easily manufacture a catalyst having a specific mixed state exhibiting a metallic bond. Any of these methods can be employed, though not confined to them, for attaching the catalytic fine particles to the conductive carrier.

Since it is possible to enhance the catalytic activity as the average particle diameter of the catalytic fine particles becomes smaller, it is preferable to confine the average particle diameter of the catalytic fine particles to 10 nm or less. If this average particle diameter is too small, it may become difficult to control the synthesizing process of the catalyst, resulting in an increase in cost of synthesizing the catalyst. Therefore, the average particle diameter of the catalytic fine particles is preferably not be less than 0.5 nm or so at minimum.

In the employment of the catalytic fine particles, it is possible to employ those which are constituted solely by fine particles having an average particle diameter of 10 nm or less. Alternatively, it is also possible to employ aggregates (secondary particles) of primary particles which are constituted by these fine particles. The average particle diameter of the catalytic fine particles can be calculated from the peak half-band width to be obtained from the XRD measurement and by the Sherrer formula.

The proton-conductive inorganic oxides include an oxide carrier and oxide particles carried on the surface of the oxide carrier. The oxide carrier may contain at least one kind of a first element selected from the group consisting of Ti, Zr and Sn, for example. The oxide particles may contain at least one kind of a second element selected from the group consisting of W, Mo and V.

As specific examples of the oxide carrier containing the first element, they include $TiO_2$, $ZrO_2$ and $SnO_2$. As specific examples of the oxide particles containing the second element, they include $WO_2$, $MoO_2$ and $V_2O_5$. As the oxide particles are carried on the surface of this oxide carrier, the Lewis acid point is enabled to occur within the structure of the oxide particles. It is supposed that as this Lewis acid point is hydrated, it is turned into Brønsted acid, thereby producing the conductive field of protons. Further, as the proton-conductive inorganic oxides are formed of an amorphous structure, the occurrence of the Lewis acid point can be promoted.

The proton-conductive inorganic oxides are effective in decreasing the number of molecules of carrier water which is needed for the conduction of protons in addition to the promotion of a proton-producing reaction through the Lewis acid point. Because of this, it is now possible to obtain high proton conductivity with a small quantity of water molecules existing on the surface of the proton-conductive inorganic oxides. As a result, it is possible to obtain large electricity generation without necessitating the strict administration of water during the electricity generation.

The oxide particles containing the second element change in the water solubility thereof depending on the kind of the element and on the environment of pH, sometimes making them water soluble. On the other hand, the oxide carrier containing the first element is low in water solubility. By enabling the oxide particles to attach to the surface of the oxide carrier exhibiting low water solubility, it is possible to suppress the solubility of the oxide particles to water. As a result, the stability of the proton-conductive inorganic oxides to water and to liquid fuel can be enhanced as compared with the case where the oxide particles are permitted to exist individually. Additionally, it is also possible to prevent the contamination of fuel cell materials and fuel cell device by the ions of eluted oxide particles and others.

Accordingly, by these proton-conductive inorganic oxides, it is possible to obtain a fuel cell exhibiting high reliability for a long time and to save the manufacturing cost of the cell.

Moreover, silicon oxide is carried on the surface of the proton-conductive inorganic oxides. In this case, the silicon oxide may be carried thereon simply as fine particles or carried thereon as a layer on the surface of the proton-conductive inorganic oxides. Irrespective of the carried state of silicon oxide, as long as the silicon oxide is carried on the surface of the proton-conductive inorganic oxides, it is possible to prevent the fuse-bonding and particle growth among the proton-conductive inorganic oxides.

The state wherein the oxide particles containing the second element and silicon oxide are carried on the oxide carrier containing the first element can be confirmed by, for example, instrumental analysis such as transmission electron microscopy (TEM), X-ray diffraction (XRD), X-ray photoelectron spectroscopy (XPS), etc.

The proton-conductive inorganic oxide can be synthesized according to the flow shown in FIG. 1. The present inventors have found out that it is possible to obtain a proton-conductive inorganic oxide which suppresses particle growth and exhibits high proton conductivity by silicon oxide particles on the occasion of synthesizing the proton-conductive inorganic oxide.

The oxide carrier containing the first element can be synthesized by any desired method. For example, it is possible to employ a vapor phase method wherein an oxide can be produced through the decomposition of a gas containing the first element, or a sol-gel method wherein a solution containing the first element or metal alkoxide containing the first element is employed as a raw material. This oxide carrier may be formed of a composite oxide containing plural kinds of metallic elements.

When Sn is employed as the first element, it is possible to sufficiently enhance the proton conductivity. Further, when Ti is employed as the first element, it is possible to realize high proton conductivity while suppressing the manufacturing cost. With respect to the configuration of the oxide carrier, it may be of various configurations such as grain-like, fibrous, flake-like, layer-like or porous. Namely, the configuration of the oxide carrier is not limited. In this oxide carrier, the surface thereof acts as a proton-conducting site. Because of this, it is possible, through the employment of particulate oxide of nano-size as the oxide carrier, to obtain a sufficient magnitude of the proton-conducting site.

The oxide particles containing the second element can be attached to the surface of the oxide carrier containing the first element by the following method for example. As the solvent, it is possible to employ water or alcohol. First, a solution having a material containing the second element dissolved in a solvent is prepared. For example, an acidic or alkaline aqueous solution containing chlorides, nitrate, hydroacid, oxoacid salts, etc.; or an alcohol solution of metal alkoxide is prepared. Then, the oxide carrier containing the first element is dispersed in this solution and the solvent in the solution is removed. In this manner, the raw material of the oxide particles containing the second element is caused to attach to the surface of the oxide carrier and then subjected to heat treatment to obtain oxide particles.

The oxide particles containing the second element may be carried on the oxide carrier in a state of composite oxide containing plural kinds of elements. Although the solvent is generally removed by heating, it is also possible to employ any other method. For example, the solvent can be removed under reduced pressure without employing heating. Furthermore, the removal of the solvent may be performed by simultaneous application of heating and reduced pressure.

As long as the oxide particles containing the second element are attached to at least a portion of the surface of the oxide carrier containing the first element, the effects of the oxide particles can be exhibited. For example, the oxide particles may be attached, as dots, to the surface of the oxide carrier or attached, as a layer, to the surface of the oxide carrier, thereby covering the surface of the oxide carrier. The oxide particles are only required to be attached to the surface of the oxide carrier and there is no restriction with regard to the crystallinity of the oxide particles or of the oxide carrier.

From the viewpoints of promoting the occurrence of the Lewis acid point, of the possibility to contribute to the enhancement of acidity, of lowering the manufacturing cost, and of easiness of the manufacturing process, not only the oxide particles but also the oxide carrier is preferably formed of an amorphous substance. More preferably, the oxide particles are formed of an amorphous substance and the oxide carrier is formed of a crystalline material. On the contrary, it is also possible to employ crystalline oxide particles and a crystalline oxide carrier. Alternatively, it is possible to employ crystalline oxide particles and an amorphous oxide carrier.

It should be noted that the state wherein the raw material of the oxide particles is adhered onto the surface of the oxide carrier is considered as being the precursor particles of the proton-conductive inorganic oxide. On the occasion of enabling the oxide particles to be carried on the surface of the oxide carrier by removing the solvent, the precursor particles strongly flocculates with each other to produce a bulky aggregate. It is very difficult to disintegrate this flocculated state, leading to an increase in manufacturing cost. On the other hand, when this aggregate is subjected, while its flocculated state is maintained, to heat treatment, the particles of oxide carrier fuse-bond to each other, producing particle growth.

When the oxide carrier is formed of fine particles such as nano-particles, the particle growth is more likely to be produced at a somewhat lower temperature than the melting point of the oxide carrier. When this particle growth is caused to occur, the specific surface area of the particle is decreased, thereby reducing the proton-conducting site. As a result, the cell resistance increases, thereby increasing the tendency to make it difficult to obtain a high output from the fuel cell as a whole.

The present inventors have succeeded to find out a method to easily disintegrate the flocculation of the precursor particles of the proton-conductive inorganic oxide. On the occasion of dispersing the oxide carrier in a solution having the substance containing the second element dissolved therein, the solvent thereof is removed after the addition of silicon oxide particles. As a result, the silicon oxide particles adhere onto the surface of the oxide carrier. Otherwise, the silicon oxide dissolved in the solution precipitates and deposits on the surface of the oxide carrier, thereby enabling the silicon oxide to be carried on the surface of the oxide carrier. Then, by subjecting the resultant body to heat treatment under the condition where the silicon oxide particles are attached as described above, it has been confirmed that the fuse-bonding and particle growth of the oxide carrier can be effectively suppressed.

The mechanism of this phenomenon can be explained as follows. Silicon oxide is an oxide which can be hardly sintered, so that when this silicon oxide interposes between the particles of flocculated oxide carrier, it becomes possible to suppress the fusion bonding among the particles of oxide carrier. In the case of the proton-conductive inorganic oxide that has been synthesized according to the aforementioned method, the oxide particles attach to not only the surface of the oxide carrier but also the surface of the silicon oxide particles. It will be very difficult to selectively remove only the oxide particles which have been carried on the surface of the silicon oxide particles.

As described above, since silicon oxide is an oxide which can be hardly sintered, the oxide particles cannot be easily bonded to each other. Because of this, the oxide particles may elute during the generation of electricity and due to this eluted components, the constituent components of fuel cell may be contaminated. In order to avoid this problem, the oxide particles that have been carried on the surface of the silicon oxide particles is preferably removed by washing in advance the silicon oxide particles by water or hot water.

Due to the washing as described above, it is possible to obtain a proton-conductive inorganic oxide which is constituted by an oxide carrier, oxide particles carried on the surface of the oxide carrier, and silicon oxide particles. This silicon oxide is an oxide which can be hardly sintered, and the bonding strength thereof to the oxide carrier may become weak depending on the synthesizing conditions thereof. If the bonding strength of the silicon oxide is weak, the silicon oxide can be removed by washing it with water or hot water in advance.

The weight ($W_{SiO2}$) of the silicon oxide particles to be carried on the surface of the carrier may be regulated to 0.1-0.5 times as high as the weight ($W_{SA}$) of the proton-conductive inorganic oxide (SA). Namely, the weight ratio ($W_{SiO2}/W_{SA}$) between the silicon oxide particles and the proton-conductive inorganic oxide is confined within the range of 0.1-0.5. If this weight ratio is lower than 0.1, the effects to inhibit the particle growth may be lowered. On the other hand, if this weight ratio is higher than 0.5, the proton conductivity or electron conductivity of the electrode catalyst layer may be decreased, leading to the decrease of output.

The average particle diameter of the silicon oxide is preferably smaller than the average particle diameter of the oxide carrier. When the easiness of handling and the effects to suppress the particle growth are taken into account, the average particle diameter of the silicon oxide is preferably confined to the range of 1-15 nm. If the average particle diameter of the silicon oxide is less than 1 nm, it may be required to attach a large quantity of silicon oxide to the oxide carrier in order to obtain sufficient effects thereof to suppress the particle growth of proton-conductive inorganic oxide, thereby permitting the proton-producing site of the surface of proton-conductive inorganic oxide to be increasingly covered by the silicon oxide. As a result, the resistance to proton conductance may become too large.

If the average particle diameter of the silicon oxide is greater than 15 nm, it may become difficult to control the uniform synthesis thereof. When the availability is also taken into account, the average particle diameter of the silicon oxide is more preferably confined to the range of 3-10 nm. Since there is no limitation with respect to the crystallinity and configuration of the particles of silicon oxide, they may be suitably selected by taking into account the manufacturing cost, etc.

As the specific surface area of the proton-conductive inorganic oxide, it is preferably confined to the range of 10-2000 $m^2/g$. When the specific surface area of the proton-conductive inorganic oxide is larger than 2000 $m^2/g$, the handling properties as well as the control of uniform synthesis may become difficult. When the specific surface area of the proton-conductive inorganic oxide is smaller than 10 $m^2/g$, it may become impossible to obtain sufficient proton conductivity. It should be noted that, since the specific surface area of the proton-conductive inorganic oxide can be represented by a specific surface area per unit weight of the proton-conductive inorganic oxide, it can be measured by the BET method.

In the proton-conductive inorganic oxide, the atomic ratio (number of M2 atoms/number of M1 atoms) between the second element (M2) contained in the oxide particles and the first element (M1) contained in the oxide carrier is preferably confined within the range of 0.0001 to 5. When this atomic ratio (number of M2 atoms/number of M1 atoms) is less than 0.0001, the quantity of oxide particles to be carried on the oxide carrier may become insufficient, thereby rendering the conductance field of protons to become insufficient. On the other hand, when this atomic ratio is more than 5, the quantity of oxide particles to be carried on the oxide carrier may become excessive, thereby rendering the conductance field of protons to be covered by the oxide particles. In either case, it may become impossible to obtain sufficient proton conductivity. More preferably, this atomic ratio (number of M2 atoms/number of M1 atoms) is confined to the range of 0.01-1.

The proton-conductive inorganic oxides can be prepared by a process wherein the precursor of the oxide particles is attached to the oxide carrier and then the resultant material is subjected to a heat treatment in an oxidizing atmosphere such as an air atmosphere. The temperature of heat treatment is preferably confined to the range of 200-1000° C. When this temperature is lower than 200° C., it may become difficult to turn the precursor of the oxide particles into oxide, thereby making it impossible to produce sufficient chemical bonding between the oxide carrier and the oxide particles. On the other hand, when this temperature is higher than 1000° C., it will lead to particle growth in addition to the fuse-bonding among the particles, thereby reducing the specific surface area. In either case, it may become impossible to obtain sufficient proton conductivity. Preferably, the temperature of heat treatment is confined to the range of 400-800° C. Incidentally, when the heat treatment is performed at a high temperature of 1000° C. or so, the time required for the heat treatment may be shortened.

The proton-conductive inorganic oxides are desirably exhibits solid superacidity. The degree of dissociation of protons can be represented by an acid strength and the acid strength of solid acid can be represented by Hammett acidity function $H_0$. For example, the acidity ($H_0$) of sulfuric acid (100%) is −11.93 and hence the solid superacidity of the proton-conductive inorganic oxides is preferably $H_0$<−11.93. Further, the acidity of the proton-conductive inorganic oxides can be increased up to $H_0$=−20.00 by optimizing the synthesizing method thereof. Therefore, it is preferable to employ the proton-conductive inorganic oxides exhibiting an acidity falling within the range of: −20.00<$H_0$<−11.93.

The acidity of the proton-conductive inorganic oxides can be measured by ammonia temperature-programmed desorption (TPD) method. Ammonia gas is adsorbed onto the sample of solid acid and then the sample is heated. Then, the quantity of desorbed ammonia and the desorption temperature are detected to analyze the solid acidity.

In addition to the aforementioned carried catalyst and proton-conductive inorganic oxides, the electrode catalytic layer of the cathode for a fuel cell according to the embodiment contains a proton-conductive organic polymer binder.

Because of high proton conductance, it is preferable to employ an organic polymer material having sulfonic acid group as the proton-conductive organic polymer binder. For example, it is possible to employ fluorinated resin having sulfonic acid group such as Nafion solution (trademark of Du Pont Co., Ltd.), Flemion (trade name of Asahi Glass Co., Ltd.), Aciplex (trade name of Asahi Kasei Co., Ltd.), etc. There is not any limitation with regard to the material for the binder as long as it is an organic polymer material having sulfonic acid group.

In the electrode catalytic layer of the cathode for a fuel cell according to the embodiment, the carried catalyst is contained therein at a weight of $W_C$ and the proton-conductive inorganic oxides carrying silicon oxide is contained therein at a weight of $W_{SA+SiO2}$. The weight ratio of ($W_{SA+SiO2}/W_C$) of these materials is regulated to the range of 0.01-0.25. When this weight ratio is less than 0.01, the proton conductivity will be decreased and when this weight ratio is more than 0.25, the electron conductivity will be decreased. In either case, it may become impossible to obtain sufficient output.

Further, the proton-conductive organic polymer binder is contained therein at a weight of $W_P$, and the weight ratio thereof to the proton-conductive inorganic oxide (SA+SiO2), i.e., ($W_P/W_{SA+SiO2}$), is confined within the range of 0.5-43. When this weight ratio is less than 0.5, the proton conductivity will be decreased and when this weight ratio is more than 43, the electron conductivity will be decreased. In either case, it may become impossible to obtain sufficient output.

By regulating the weight ratios in this manner among the carried catalyst, the proton-conductive inorganic oxides and the proton-conductive organic polymer binder, it is possible to remarkably improve the characteristics of the fuel cell. This phenomenon has been first discovered by the present inventors and was not known up to date.

Although it is not yet made clear with regard to the details of this mechanism, it may be explained as follows. The proton-conductive polymer is constituted by a hydrophobic main chain and by a hydrophilic sulfonic acid group having an ion exchange capability, so that it may take a micro-phase separation structure through the formation of cluster where hydrophilic portions are gathered.

Since the surface of the proton-conductive inorganic oxide is hydrophilic, when the proton-conductive inorganic oxides and the proton-conductive polymer are mixed together in the catalytic layer, the proton-conductive inorganic oxides dispose at the hydrophilic cluster portion having the micro-phase separation structure of proton-conductive polymer, thereby promoting the micro-phase separation. As a result, it is assumably made possible to obtain a catalytic layer which is low in proton conductance resistance.

Using the aforementioned cathode, the membrane electrode assembly according to one embodiment can be constructed. Namely, the membrane electrode assembly according to this embodiment comprises an anode, a cathode and a proton-conductive membrane interposed between the anode and the cathode. Further, the fuel cell according to a further embodiment is provided with this membrane electrode assembly.

As schematically shown in the cross-sectional view of FIG. 2, the fuel cell according to this embodiment comprises a membrane electrode assembly (MEA) 12, a cathode holder 9 provided with oxidizing gas supply channels 8, and an anode holder 11 provided with fuel supply channels 10.

The MEA 12 comprises an anode (fuel electrode) 2, a cathode (oxidizer electrode) 3, and a proton-conductive membrane 1. The anode 2 is constituted by a diffusion layer 4 and an anode catalytic layer 5 laminated on the diffusion layer 4. The cathode 3 is constituted by a diffusion layer 6 and a cathode catalytic layer 7 laminated on the diffusion layer 6. The anode 2 and the cathode 3 are laminated such that the anode catalytic layer is disposed to face the cathode catalytic layer with the proton-conductive membrane 1 interposed therebetween.

As already explained above, the cathode catalytic layer 7 can be manufactured by the carried catalyst, the proton-conductive inorganic oxides and the proton-conductive organic polymer binder. In addition to these materials, a non-proton-conductive binder may be further incorporated therein. In this case, it may become possible to preferably maintain the state of the catalytic layers. As the non-proton-conductive binder, it is possible to employ, for example, tetrafluoroethylene (PTEF), tetrafluoroethylene-hexafluoropropylene copolymer (FEP), tetrafluoroethylene perfluoroalkyl vinylether copolymer (PFA), etc.

In order to avoid the deterioration of output that may originate from the increase in cell resistance, the content of the non-proton-conductive binder is preferably confined to the range of 1-10% based on a total weight of the cathode catalytic layer. More preferably, the content of the non-proton-conductive binder is confined to the range of 2-5% based on a total weight of the cathode catalytic layer.

The anode catalytic layer 5 comprises an anode catalyst, and a proton-conductive organic polymer binder. As the anode catalyst, it is possible to employ, for example, PtRu. Although this catalyst can be carried on a carrier, it may be used as it is without being carried on the carrier.

As the diffusion layers 6 and 4, they may be formed by a conductive porous sheet. As the conductive porous sheet, it is possible to use a sheet made of an air-permeable or liquid-permeable material including, for example, carbon cloth, carbon paper, etc.

The cathode and anode can be manufactured according to any known method. For example, the aforementioned materials are mixed with water or an organic solvent such as alcohol and dispersed to produce a catalytic slurry. Then, this slurry is coated on the aforementioned conductive porous sheet and dried and, as required, sintered to form the catalytic layer. As the dispersing method, there is not any limitation and hence it is possible to employ a dissolver, ball mill, etc.

The proton-conductive membrane can be bonded to the electrodes (anode and cathode) by an apparatus which is capable of applying heating and/or compression. Generally, they can be bonded together through thermocompression bonding using a hot press machine. The press temperature on this occasion may be not lower than the glass transition temperature of a proton-conductive polymer to be used as a binder, e.g. 100-400° C. As the pressing pressure, it depends on the hardness of the electrodes to be used. Generally however, it may be 5-200 kg/cm$^2$ (0.49-19.6 MPa).

The fuel cell according to one embodiment comprises the aforementioned MEA, means for feeding fuel to the anode, and means for feeding an oxidizing agent to the cathode. As the number of MEA to be used, it may be only one or two or more. By a plurality of MEAs, it may become possible to obtain higher electromotive force. As the fuel, it is possible to use methanol, ethanol, formic acid or an aqueous solution containing at least one selected from the group consisting of methanol, ethanol and formic acid.

EXAMPLE 1

First, a proton-conductive inorganic oxide was synthesized. 1.5 g of vanadium oxide ($V_2O_5$) was dissolved in 100 mL of aqueous ammonia to prepare a solution. 13 g of titanium oxide ($TiO_2$) was dispersed in 500 mL of distilled water and then mixed with the solution prepared in advance and containing vanadium as described above. 4.4 g of silicon oxide ($SiO_2$) particles was dispersed into the resultant mixed solution thus obtained. The average particle diameter of the $SiO_2$ particles was 3 nm or so. The resultant mixed solution was heated to 80° C. with continuous stirring. After water in the mixed solution was removed at an evaporation rate of 100 mL/hour, the residue was kept in a drying oven heated to 100° C. for 12 hours to obtain powder.

This powder was pulverized in an agate mortar. The resultant powder was then placed in an alumina crucible and heated to 500° C. at a heating rate of 100° C./hour. Additionally, the powder was maintained at this temperature of 500° C. for four hours to obtain the proton-conductive inorganic oxide which was carried on the $SiO_2$ particles. In this case, the first element and the second element were titanium and vanadium, respectively.

The proton-conductive inorganic oxide which was carried on the surface of the $SiO_2$ particles was subjected to X-ray diffraction measurement. The diffraction peak observed in this manner was all belonged to the titanium oxide. The vanadium oxide and silicon oxide were confirmed as having an amorphous structure.

The atomic ratio (number of M2 atoms/number of M1 atoms) in this proton-conductive inorganic oxide was determined by inductively coupled plasma optical emission spectrometry (ICP-AES). The specific surface area of this inorganic oxide was determined by BET method. The solid acidity of this inorganic oxide was determined by the ammonia temperature-programmed desorption (TPD) method. The results thus obtained are summarized in the following Table 1.

Using the proton-conductive inorganic oxide thus obtained, a cathode was manufactured. 2 g of a Pt-carried catalyst, 0.3 g of proton-conductive inorganic oxide, 4.5 g of 20% Nafion solution (trade name of Du Pont Co., Ltd.), 3 g of water and 3 g of 2-ethoxyethanol were sufficiently agitated and dispersed, thereby obtaining a slurry.

Using a control coater, the aforementioned slurry was coated on the water-repellant carbon paper (270 μm; Toray Industries, Inc.) and then allowed to dry. By the procedures described above, it was possible to obtain a cathode having a noble metal catalyst-loading density of 1 mg/cm$^2$.

The cathode thus obtained was investigated with respect to the weight ratio ($W_{SA+SiO2}/W_C$) between the carried catalyst (C) and the proton-conductive inorganic oxide ($SA+SiO_2$) containing silicon oxide ($SiO_2$), to the weight ratio ($W_P/W_{SA+SiO2}$) between the proton-conductive inorganic oxide ($SA+SiO_2$) containing silicon oxide ($SiO_2$) and the proton-conductive organic polymer binder (P), and to the weight ratio ($W_{SiO2}/W_{SA}$) between the silicon oxide ($SiO_2$) particles and the proton-conductive inorganic oxide (SA), the results being summarized in the following Table 2.

These weight ratios were calculated from the charged compositions.

EXAMPLE 2

A proton-conductive inorganic oxide carrying $SiO_2$ was prepared according to the same procedures described in Example 1 except that 1.5 g of vanadium oxide ($V_2O_5$) was replaced by 2.4 g of molybdenum oxide ($MoO_3$), the content of the silicon oxide ($SiO_2$) was changed to 4.6 g and the sintering temperature was changed to 600° C. In this case, the first element and the second element were titanium and molybdenum, respectively.

EXAMPLE 3

A proton-conductive inorganic oxide carrying $SiO_2$ was prepared according to the same procedures described in Example 1 except that 1.5 g of vanadium oxide ($V_2O_5$) was replaced by 4.0 g of tungsten oxide ($WO_3$), the content of the silicon oxide ($SiO_2$) was changed to 5.1 g and the sintering temperature was changed to 700° C. In this case, the first element and the second element were titanium and tungsten, respectively.

EXAMPLE 4

A proton-conductive inorganic oxide carrying $SiO_2$ was prepared according to the same procedures described in Example 1 except that 13 g of titanium oxide ($TiO_2$) was replaced by 20 g of zirconium oxide ($ZrO_2$), and the content of the silicon oxide ($SiO_2$) was changed to 6.5 g. In this case, the first element and the second element were zirconium and vanadium, respectively.

EXAMPLE 5

A proton-conductive inorganic oxide carrying $SiO_2$ was prepared according to the same procedures described in Example 2 except that 13 g of titanium oxide ($TiO_2$) was replaced by 20 g of zirconium oxide ($ZrO_2$), and the content of the silicon oxide ($SiO_2$) was changed to 6.7 g. In this case, the first element and the second element were zirconium and molybdenum, respectively.

EXAMPLE 6

A proton-conductive inorganic oxide carrying $SiO_2$ was prepared according to the same procedures described in Example 3 except that 13 g of titanium oxide ($TiO_2$) was replaced by 20 g of zirconium oxide ($ZrO_2$), and the content of the silicon oxide ($SiO_2$) was changed to 7.2 g. In this case, the first element and the second element were zirconium and tungsten, respectively.

EXAMPLE 7

A proton-conductive inorganic oxide carrying $SiO_2$ was prepared according to the same procedures described in Example 1 except that 13 g of titanium oxide ($TiO_2$) was replaced by 25 g of tin oxide ($SnO_2$), and the content of the silicon oxide ($SiO_2$) was changed to 8.0 g. In this case, the first element and the second element were tin and vanadium, respectively.

EXAMPLE 8

A proton-conductive inorganic oxide carrying $SiO_2$ was prepared according to the same procedures described in Example 2 except that 13 g of titanium oxide ($TiO_2$) was replaced by 25 g of tin oxide ($SnO_2$), and the content of the silicon oxide ($SiO_2$) was changed to 8.2 g. In this case, the first element and the second element were tin and molybdenum, respectively.

EXAMPLE 9

A proton-conductive inorganic oxide carrying $SiO_2$ was prepared according to the same procedures described in Example 3 except that 13 g of titanium oxide ($TiO_2$) was replaced by 25 g of tin oxide ($SnO_2$), and the content of the silicon oxide ($SiO_2$) was changed to 8.7 g. In this case, the first element and the second element were tin and tungsten, respectively.

EXAMPLE 10

A proton-conductive inorganic oxide carrying $SiO_2$ was prepared according to the same procedures described in Example 3 except that the content of the proton-conductive inorganic oxide was changed to 0.02 g, and the content of the 20% Nafion solution (trade name of Du Pont Co., Ltd.) was changed to 0.3 g.

EXAMPLE 11

A proton-conductive inorganic oxide carrying $SiO_2$ was prepared according to the same procedures described in Example 3 except that the content of the proton-conductive inorganic oxide was changed to 0.24 g, and the content of the 20% Nafion solution (trade name of Du Pont Co., Ltd.) was changed to 3.7 g.

EXAMPLE 12

A proton-conductive inorganic oxide carrying $SiO_2$ was prepared according to the same procedures described in Example 3 except that the content of the proton-conductive inorganic oxide was changed to 0.5 g, and the content of the 20% Nafion solution (trade name of Du Pont Co., Ltd.) was changed to 7.7 g.

EXAMPLE 13

A proton-conductive inorganic oxide carrying $SiO_2$ was prepared according to the same procedures described in Example 3 except that the content of the proton-conductive inorganic oxide was changed to 0.5 g, and the content of the 20% Nafion solution (trade name of Du Pont Co., Ltd.) was changed to 1.4 g.

EXAMPLE 14

A proton-conductive inorganic oxide carrying $SiO_2$ was prepared according to the same procedures described in Example 3 except that the content of the proton-conductive inorganic oxide was changed to 0.04 g, and the content of the 20% Nafion solution (trade name of Du Pont Co., Ltd.) was changed to 4.4 g.

EXAMPLE 15

A proton-conductive inorganic oxide carrying $SiO_2$ was prepared according to the same procedures described in Example 3 except that the content of the proton-conductive inorganic oxide was changed to 0.02 g, and the content of the 20% Nafion solution (trade name of Du Pont Co., Ltd.) was changed to 4.3 g.

EXAMPLE 16

A proton-conductive inorganic oxide carrying $SiO_2$ was prepared according to the same procedures described in Example 3 except that the content of silicon oxide ($SiO_2$) was changed to 1.7 g.

EXAMPLE 17

A proton-conductive inorganic oxide carrying $SiO_2$ was prepared according to the same procedures described in Example 3 except that the content of silicon oxide ($SiO_2$) was changed to 8.5 g.

COMPARATIVE EXAMPLE 1

A proton-conductive inorganic oxide carrying $SiO_2$ was prepared according to the same procedures described in Example 1 except that the content of the proton-conductive inorganic oxide was changed to 0.01 g, and the content of the 20% Nafion solution (trade name of Du Pont Co., Ltd.) was changed to 1.9 g.

COMPARATIVE EXAMPLE 2

A proton-conductive inorganic oxide carrying $SiO_2$ was prepared according to the same procedures described in Example 1 except that the content of the proton-conductive inorganic oxide was changed to 0.55 g, and the content of the 20% Nafion solution (trade name of Du Pont Co., Ltd.) was changed to 8.5 g.

COMPARATIVE EXAMPLE 3

A proton-conductive inorganic oxide carrying $SiO_2$ was prepared according to the same procedures described in Example 1 except that the content of the 20% Nafion solution (trade name of Du Pont Co., Ltd.) was changed to 0.6 g.

COMPARATIVE EXAMPLE 4

A proton-conductive inorganic oxide carrying $SiO_2$ was prepared according to the same procedures described in Example 1 except that the content of the proton-conductive inorganic oxide was changed to 0.04 g, and the content of the 20% Nafion solution (trade name of Du Pont Co., Ltd.) was changed to 9.8 g.

COMPARATIVE EXAMPLE 5

A proton-conductive inorganic oxide carrying $SiO_2$ was prepared according to the same procedures described in Example 1 except that the content of silicon oxide ($SiO_2$) was changed to 0.1 g.

COMPARATIVE EXAMPLE 6

A proton-conductive inorganic oxide carrying $SiO_2$ was prepared according to the same procedures described in Example 1 except that the content of silicon oxide ($SiO_2$) was changed to 10 g.

The proton-conductive inorganic oxides of Examples 2-17 and Comparative Examples 1-6 were examined according to the same procedures described in Example 1 with respect to the atomic ratio (number of M2 atoms/number of M1 atoms), the specific surface area and the solid acidity. The results thus obtained are summarized in the following Table 1.

TABLE 1

| | Proton-conductive inorganic oxides (SA) | | | Specific surface area $(m^2/g)$ | Acidity coefficient $H_0$ |
|---|---|---|---|---|---|
| | Oxide of 1st element | 2nd elements | (M2/M1) | | |
| Ex. 1 | $TiO_2$ | V | 0.1 | 101 | −12.70 |
| Ex. 2 | $TiO_2$ | Mo | 0.1 | 100 | −13.00 |
| Ex. 3 | $TiO_2$ | W | 0.1 | 99 | −13.16 |
| Ex. 4 | $ZrO_2$ | V | 0.1 | 100 | −13.75 |
| Ex. 5 | $ZrO_2$ | Mo | 0.1 | 101 | −14.00 |
| Ex. 6 | $ZrO_2$ | W | 0.1 | 102 | −14.50 |
| Ex. 7 | $SnO_2$ | V | 0.1 | 100 | −15.00 |
| Ex. 8 | $SnO_2$ | Mo | 0.1 | 99 | −15.80 |
| Ex. 9 | $SnO_2$ | W | 0.1 | 100 | −16.04 |
| Ex. 10 | $TiO_2$ | W | 0.1 | 100 | −13.16 |
| Ex. 11 | $TiO_2$ | W | 0.1 | 102 | −13.16 |
| Ex. 12 | $TiO_2$ | W | 0.1 | 100 | −13.16 |
| Ex. 13 | $TiO_2$ | W | 0.1 | 101 | −13.16 |
| Ex. 14 | $TiO_2$ | W | 0.1 | 102 | −13.16 |
| Ex. 15 | $TiO_2$ | W | 0.1 | 100 | −13.16 |
| Ex. 16 | $TiO_2$ | W | 0.1 | 101 | −13.16 |
| Ex. 17 | $TiO_2$ | W | 0.1 | 100 | −13.16 |
| Comp. Ex. 1 | $TiO_2$ | V | 0.1 | 100 | −12.70 |
| Comp. Ex. 2 | $TiO_2$ | V | 0.1 | 101 | −12.70 |
| Comp. Ex. 3 | $TiO_2$ | V | 0.1 | 101 | −12.70 |
| Comp. Ex. 4 | $TiO_2$ | V | 0.1 | 100 | −12.70 |
| Comp. Ex. 5 | $TiO_2$ | V | 0.1 | 60 | −12.70 |
| Comp. Ex. 6 | $TiO_2$ | V | 0.1 | 100 | −12.70 |

Using the proton-conductive inorganic oxides obtained in Examples 2-17 and Comparative Examples 1-6, cathodes were respectively manufactured by following the same procedures employed in Example 1. By following the same procedures described in Example 1, each of the cathodes thus obtained was investigated with respect to the weight ratio ($W_{SA+SiO2}/W_C$) between the carried catalyst (C) and the proton-conductive inorganic oxide ($SA+SiO_2$) containing silicon oxide ($SiO_2$), to the weight ratio ($W_P/W_{SA+SiO2}$) between the proton-conductive inorganic oxide ($SA+SiO_2$) containing silicon oxide ($SiO_2$) and the proton-conductive organic polymer binder (P), and to the weight ratio ($W_{SiO2}/W_{SA}$) between the silicon oxide ($SiO_2$) particles and the proton-conductive inorganic oxide (SA), the results being summarized in the following Table 2.

TABLE 2

| | $W_{SA+SiO2}/W_C$ | $W_P/W_{SA+SiO2}$ | $W_{SiO2}/W_{SA}$ |
|---|---|---|---|
| Ex. 1 | 0.15 | 3 | 0.3 |
| Ex. 2 | 0.15 | 3 | 0.3 |
| Ex. 3 | 0.15 | 3 | 0.3 |
| Ex. 4 | 0.15 | 3 | 0.3 |
| Ex. 5 | 0.15 | 3 | 0.3 |
| Ex. 6 | 0.15 | 3 | 0.3 |
| Ex. 7 | 0.15 | 3 | 0.3 |
| Ex. 8 | 0.15 | 3 | 0.3 |
| Ex. 9 | 0.15 | 3 | 0.3 |
| Ex. 10 | 0.01 | 3 | 0.3 |
| Ex. 11 | 0.12 | 3 | 0.3 |
| Ex. 12 | 0.25 | 3 | 0.3 |
| Ex. 13 | 0.25 | 0.5 | 0.3 |
| Ex. 14 | 0.02 | 22 | 0.3 |
| Ex. 15 | 0.01 | 43 | 0.3 |
| Ex. 16 | 0.15 | 3 | 0.1 |
| Ex. 17 | 0.15 | 3 | 0.5 |
| Comp. Ex. 1 | 0.005 | 38 | 0.3 |
| Comp. Ex. 2 | 0.275 | 3 | 0.3 |
| Comp. Ex. 3 | 0.15 | 0.4 | 0.3 |
| Comp. Ex. 4 | 0.02 | 49 | 0.3 |
| Comp. Ex. 5 | 0.15 | 3 | 0.01 |
| Comp. Ex. 6 | 0.15 | 3 | 0.7 |

COMPARATIVE EXAMPLE 7

3 g of a Pt-carried catalyst, 8 g of water, 10 g of 20% Nafion solution (trade name of Du Pont Co., Ltd.), and 10 g of 2-ethoxyethanol were sufficiently agitated and dispersed, thereby obtaining a slurry. By a control coater, the slurry thus obtained was coated on the water-repellant carbon paper (270 μm, Toray Industries, Inc.) and then allowed to dry to manufacture a cathode. The noble metal catalyst-loading density of the obtained cathode was 1 mg/cm$^2$.

Using the cathodes obtained in Examples 1-17 and Comparative Examples 1-7, membrane electrode assemblies were manufactured according to the following procedures.

First, 2 g of a PtRu catalyst, 5 g of water, 5 g of 20% Nafion solution (trade name of Du Pont Co., Ltd.), and 20 g of 2-ethoxyethanol were sufficiently agitated and dispersed, thereby obtaining a slurry for an anode. By a control coater, the slurry thus obtained was coated on the water-repellant carbon paper (350 μm; Toray Industries, Inc.) and then allowed to dry to manufacture the anode. The noble metal catalyst-loading density of the obtained anode was 2 mg/cm$^2$.

The anode and cathode were respectively cut to a square configuration (3.2 cm×3.2 cm) so as to make them have an electrode surface area of 10 cm$^2$. By these cut anode and cathode, Nafion 117 (trade name of Du Pont Co., Ltd.) acting as a proton-conductive organic polymer film was sandwiched between the anode and the cathode. Then, the resultant composite body was subjected to thermocompression bonding for 10 minutes under the conditions of: 125° C. and 30 kg/cm$^2$ (2.94 MPa), thereby obtaining a membrane electrode assembly.

A cathode holder and an anode holder were disposed on the cathode side and the anode side of this membrane electrode assembly, respectively, thereby manufacturing a unit cell for use in a fuel direct supply type solid polymer electrolytic type fuel battery. A 1M aqueous methanol solution employed as fuel was supplied to the anode at a flow rate of 0.6 mL/min and, at the same time, air was supplied to the cathode at a flow rate of 200 mL/min. Under these conditions and in a state where the cell was maintained at a temperature of 65° C., the cell was permitted to generate electricity at a current density of 150 mA/cm$^2$. Then, the cell voltage after 30 minutes was measured, the results being summarized in the following Table 3.

TABLE 3

|  | Voltage (V) |
|---|---|
| Ex. 1 | 0.48 |
| Ex. 2 | 0.48 |
| Ex. 3 | 0.49 |
| Ex. 4 | 0.49 |
| Ex. 5 | 0.50 |
| Ex. 6 | 0.51 |
| Ex. 7 | 0.51 |
| Ex. 8 | 0.51 |
| Ex. 9 | 0.52 |
| Ex. 10 | 0.38 |
| Ex. 11 | 0.47 |
| Ex. 12 | 0.42 |
| Ex. 13 | 0.45 |
| Ex. 14 | 0.40 |
| Ex. 15 | 0.35 |
| Ex. 16 | 0.47 |
| Ex. 17 | 0.45 |
| Comp. Ex. 1 | 0.28 |
| Comp. Ex. 2 | 0.32 |
| Comp. Ex. 3 | 0.30 |
| Comp. Ex. 4 | 0.38 |
| Comp. Ex. 5 | 0.31 |
| Comp. Ex. 6 | 0.37 |
| Comp. Ex. 7 | 0.25 |

As shown in Table 3, in the MEA of Comparative Example 7 wherein a cathode containing no proton-conductive inorganic oxide was employed, the cell voltage thereof was 0.25 V at most. Whereas, in the MEA of each of the Examples wherein the cathode contained a proton-conductive inorganic oxide in addition to a carried catalyst and a proton-conductive organic polymer binder, it was possible, in every MEA, to realize a high cell voltage.

In any of the Examples, the weight ratio ($W_{SA+SiO2}/W_C$) between the carried catalyst (C) and the proton-conductive inorganic oxide (SA+SiO$_2$) containing silicon oxide (SiO$_2$) was confined within the range of 0.01-0.25 and the weight ratio ($W_P/W_{SA+SiO2}$) between the proton-conductive inorganic oxide (SA+SiO$_2$) containing silicon oxide (SiO$_2$) and the proton-conductive organic polymer binder (P) was confined within the range of 0.5-43. Furthermore, the weight ratio ($W_{SiO2}/W_{SA}$) between the silicon oxide (SiO$_2$) particles and the proton-conductive inorganic oxide (SA) was confined within the range of 0.1-0.5.

It is indicated in Table 3 that since all of the MEAs of the Examples satisfies all of these conditions, it was possible to obtain high cell voltage in the MEAs of the Examples. If any of these weight ratios was caused to fall outside these ranges, the cell voltage was caused to deteriorate.

It will be recognized from the comparison between Example 1 and Comparative Example 1 that when the weight ratio ($W_{SA+SiO2}/W_C$) between the carried catalyst (C) and the proton-conductive inorganic oxide (SA+SiO$_2$) containing SiO$_2$ was caused to fall outside the range of 0.01-0.25, the cell voltage was caused to deteriorate.

It will be recognized from the comparison between Example 1 and Comparative Examples 3 and 4 that when the weight ratio ($W_P/W_{SA+SiO2}$) between the proton-conductive inorganic oxide (SA+SiO$_2$) containing SiO$_2$ and the proton-conductive organic polymer binder (P) was caused to fall outside the range of 0.5-43, the cell voltage was caused to deteriorate.

Further, it will be recognized from the comparison between Example 1 and Comparative Examples 5 and 6 that when the weight ratio ($W_{SiO2}/W_{SA}$) between the SiO$_2$ particles and the proton-conductive inorganic oxide (SA) was caused to fall outside the range of 0.1-0.5, the cell voltage was caused to deteriorate.

As explained above, according to the embodiment of the present invention, it is possible to provide a cathode which is effective in providing a fuel cell which is capable of obtaining a higher output as compared with the conventional fuel cells.

According to the present invention, it is possible to provide a cathode for a fuel cell exhibiting a higher output.

Further, the present invention is not limited to the above-described embodiments per se but constituent elements of these embodiments may be variously modified in actual use thereof without departing from the spirit of the present invention. Further, the constituent elements described in these various embodiments may be suitably combined to create various inventions. For example, some of the constituent elements described in these embodiments may be deleted. Further, the constituent elements described in different embodiments may be optionally combined with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cathode for a fuel cell comprising an electrode catalyst layer, wherein the electrode catalyst layer comprises:
a carried catalyst containing a conductive carrier and catalytic fine particles carried on the conductive carrier, the carried catalyst being incorporated therein at a weight of $W_C$;
a proton-conductive inorganic oxide containing an oxide carrier and oxide particles carried on a surface of the oxide carrier;
silicon oxide carried on the surface at a weight ratio of 0.1 to 0.5 times as much as the weight of the proton-conductive inorganic oxide, a weight ratio ($W_{SA+SiO2}/W_C$) between the weight $W_C$ of carried catalyst and a total weight ($W_{SA+SiO2}$) of the proton-conductive inorganic oxide and the silicon oxide being confined to 0.01-0.25; and
a proton-conductive organic polymer binder which is incorporated therein at a weight of $W_P$, the weigh ratio ($W_P/W_{SA+SiO2}$) thereof relative to the total weight of the proton-conductive inorganic oxide and the silicon oxide being confined to 0.5-43.

2. The cathode according to claim 1, wherein the conductive carrier is selected from carbon black and ceramic materials having electric conductivity.

3. The cathode according to claim 1, wherein the catalytic fine particles contain Pt or Pt alloys.

4. The cathode according to claim 1, wherein the catalytic fine particles have an average particle diameter of 0.5-10 nm.

5. The cathode according to claim 1, wherein the oxide carrier in the proton-conductive inorganic oxides contains at least one kind of a first element M1 selected from the group consisting of Ti, Zr and Sn.

6. The cathode according to claim 5, wherein the oxide particles in the proton-conductive inorganic oxides contains at least one kind of a second element M2 selected from the group consisting of W, Mo and V.

7. The cathode according to claim 6, wherein an atomic ratio of the second element to the first element (number of M2 atoms/number of M1 atoms) is confined to 0.0001 to 5.

8. The cathode according to claim 7, wherein the atomic ratio of the second element to the first element (number of M2 atoms/number of M1 atoms) is confined to 0.01 to 1.

9. The cathode according to claim 1, wherein Hammett acidity function $H_0$ of the proton-conductive inorganic oxides is confined to $-20.00 < H_0 < -11.93$.

10. The cathode according to claim 1, wherein the silicon oxide is carried on the surface of the proton-conductive inorganic oxides as a layer.

11. The cathode according to claim 1, wherein the silicon oxide carried on the surface of the proton-conductive inorganic oxides is formed of particles.

12. The cathode according to claim 11, wherein the average particle diameter of the silicon oxide is confined to 1-15 nm.

13. The cathode according to claim 12, wherein the silicon oxide has an average particle diameter of 3-10 nm.

14. The cathode according to claim 1, wherein the proton-conductive inorganic oxides has a specific surface area ranging from 10 to 2000 m²/g.

15. The cathode according to claim 1, wherein the proton-conductive organic polymer binder contains sulfonic acid group.

16. The cathode according to claim 1, wherein the electrode catalyst layer further contains a non-proton-conductive binder.

17. The cathode according to claim 16, wherein the non-proton-conductive binder is selected from the group consisting of tetrafluoroethylene, tetrafluoroethylene-hexafluoropropylene copolymer, and tetrafluoroethylene perfluoroalkyl vinylether copolymer.

18. The cathode according to claim 16, wherein the non-proton-conductive binder is contained at a ratio of 10% or less based on the weight of the electrode catalyst layer.

19. A membrane electrode assembly comprising:
a fuel electrode;
an oxidizer electrode; and
an proton conductive membrane having the cathode for a fuel cell which is defined in claim 1 and disposed between the fuel electrode and the oxidizer electrode.

20. A fuel cell comprising the membrane electrode assembly defined in claim 19.

* * * * *